United States Patent
Lu et al.

(10) Patent No.: US 7,304,995 B2
(45) Date of Patent: Dec. 4, 2007

(54) SYSTEMS AND METHODS FOR PACKET FLOW CONTROL

(75) Inventors: Xiaolin Lu, Plano, TX (US); Ping Tao, Houston, TX (US); Michael O. Polley, Garland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 991 days.

(21) Appl. No.: 10/037,101

(22) Filed: Dec. 31, 2001

(65) Prior Publication Data

US 2003/0043744 A1 Mar. 6, 2003

Related U.S. Application Data (60) Provisional application No. 60/315,817, filed on Aug. 29, 2001.

(51) Int. Cl.
*H04L 12/56* (2006.01)
(52) U.S. Cl. .................. 370/394; 370/503; 370/508
(58) Field of Classification Search .................. 455/69, 455/502; 370/503, 596, 509–514, 517–520, 370/350
See application file for complete search history.

(56) References Cited

U.S. PATENT DOCUMENTS

| 5,084,877 | A  | * | 1/1992 | Netravali et al. | 714/748 |
|---|---|---|---|---|---|
| 5,815,667 | A  | * | 9/1998 | Chien et al. | 709/232 |
| 6,366,786 | B1 | * | 4/2002 | Norman et al. | 455/502 |
| 6,470,057 | B1 | * | 10/2002 | Hui et al. | 375/294 |
| 6,539,004 | B1 | * | 3/2003 | Sawyer | 370/331 |
| 6,577,872 | B1 | * | 6/2003 | Lundh et al. | 455/502 |
| 2002/0131398 | A1 | * | 9/2002 | Taylor | 370/350 |

* cited by examiner

*Primary Examiner*—Robert W. Wilson
(74) *Attorney, Agent, or Firm*—Steven A. Shaw; W. James Brady; Frederick J. Telecky, Jr.

(57) ABSTRACT

Systems and methods for transmitting packets and controlling packet flow are provided in wireless communication systems. A time stamping technique synchronizes timers/and clocks between one or more senders and receivers in a wireless communication system. Additionally, a global acknowledgement frame carries a plurality of acknowledgement messages, such as one for each services identification (SID).

11 Claims, 6 Drawing Sheets

SYSTEMS AND METHODS FOR PACKET FLOW CONTROL

CROSS REFERENCE TO RELATED APPLICATIONS

The present application claims the benefit of U.S. Provisional Patent Application Ser. No. 60/315,817, filed Aug. 29, 2001, entitled BROADBAND WIRELESS MEDIA ACCESS CONTROLLER, and which is incorporated herein by reference.

TECHICAL FIELD

The present invention relates generally to packet flow control and relates more particularly to time stamping packets sent between packet sender(s) and receiver(s) and globally acknowledging packets sent between sender(s) and receiver(s).

BACKGROUND OF INVENTION

In packet based wired and wireless communication systems packets can be lost during packet transmission. Therefore, systems and methods for determining when a packet has been lost and/or to correct packet transmission errors have been developed. For example, in cable modem data communications there is a forward error correction protocol. In the well-known TCP/IP protocol an acknowledgement protocol has been employed whereby a receiver sends an acknowledgement for a received packet. If the sender does not receive the acknowledgement for a pre-determined period of time, the sender will retransmit the packet up to a pre-determined number of times before considering transmission of such a packet hopeless. Traditionally, acknowledgement protocols employ a sender side timer and timeout per logical flow of packets. Such per logical flow allocation of resources at the sender is inefficient, leading to overly lengthy timeout periods and over allocation of timer resources.

Conventionally, each logical flow in a packet based communication system could have its own ACK stream. Thus, there could be, for example, one ACK per packet transmitted or one ACK for each logical flow. Thus, there could be one software timer and data structure(s) associated with each logical flow, which becomes highly inefficient. Furthermore, the ACKs that were transmitted back from a receiver to a sender may have been sent in a periodic burst packet, for example, and may not have consumed a significant portion of such a packet. For example, an ACK could consume twelve bytes while a burst was three hundred and eighty bytes. Thus, bandwidth is wasted as packets containing ACKs include a large percentage of unused characters when transmitted in a burst.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for systems and methods for packet flow control to mitigate error transmissions in a wireless communication system in an efficient manner. In one aspect of the invention, a time stamping technique is employed to synchronize timers/and clocks between one or more senders and receivers in a wireless communication system. The time stamping technique comprises recording an expected arrival time of a transmitted data packet by a sender and recording an acknowledgement time in an acknowledgement (ACK) response from the receiver. The sender can then compare the acknowledgement time in the ACK response with the recorded expected arrival time to determine if a proper acknowledgement has occurred for that packet. If an ACK response having an acknowledgement time substantially the same as or greater than the expected arrival time, has not been received by the sender, the sender can determine that the packet has been lost. The sender can then take an appropriate action (e.g., retransmit packets, timeout, request an acknowledgement) for the lost packet.

In another aspect of the invention, a global acknowledgement frame is employed carrying a plurality of acknowledgement messages, for example, one for each services identification (SID). The global acknowledgement frame can be a Media Access Control (MAC) management frame. For example, the acknowledgement request protocol can provide services on a per service flow basis with the periodic acknowledgements from the services being global. A sender transmits one or more data packets to one or more services on one or more receivers. The one or more services and/or receivers respond with and acknowledgement frame that includes status of downstream SIDs that are enabled and are active in the current acknowledgement period. An excluded SID informs the sender that the receiver did not have any activity with respect to the excluded SID during the time period. The sender can then take an appropriate action (e.g., retransmit packets, timeout, request an acknowledgement).

In one aspect of the present invention, the solution for the time stamp technique and global acknowledgement is a complete software solution residing in the Media Access Control (MAC) layer. While the example solution is software in the MAC layer, it is to be appreciated that the solution could be implemented in other layers, in firmware and/or in silico.

In another aspect of the present invention, timers and/or clocks on the Wireless Access Termination System (WATS) and the Wireless Modem (WM) are synchronized employing a timestamp technique. After synchronization, timestamps are added to ACKs sent from the WM to the WATS. The WATS knows approximately when a packet it sends to the WM should arrive at the WM and thus approximately when the ACK should arrive. Therefore, the WATS can determine if a packet was lost and can make such determination earlier than in conventional timeout processing. More generally, a sender knows that in an ACK frame $ACK_{Tx}$, there should be ACKs for packets $\{a, b, \ldots z\}$. If the ACK frame does not contain an expected ACK, then the sender can more quickly determine whether to retransmit the packet, abandon hope (e.g., timeout) of transmitting the packet or request an acknowledgement for the packet. Furthermore, since there is a WM timer synchronized with the WATS timer and the ACK sent from the WM contains a time stamp related to when it was sent, the WM does not have to maintain a timer for each logical flow, which reduces complexity and overhead at the WATS.

In yet another aspect of the present invention, a global acknowledgement technique is employed between a WATS and a WM. The global acknowledgement technique facilitates aggregating ACKs for one or more logical flows into an ACK frame that can more efficiently utilize packet space for ACKs returned to a sender. The ACKs stored in the ACK frame can contain timer synchronized timestamps. Therefore, the sender does not need separate timers and data structure(s) for each logical flow. Furthermore, by scheduling the transmission of ACK frames, instead of relying on ad hoc and/or interrupt driven ACK packet delivery, more deterministic processing can be performed with respect to determining whether a packet has been received, which can reduce timeout delays. In one aspect of the present invention, global acking and time stamps can be selectively enabled and/or disabled per logical flow.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

The present invention relates to systems and methods for packet flow control that mitigates error transmissions in wireless communication systems in an efficient manner. In one aspect of the invention, a time stamping technique is employed to synchronize timers/and clocks between one or more senders and receivers in a wireless communication system. In another aspect of the invention, a global acknowledgement frame is employed in a wireless communication system. The global acknowledgement frame carries a plurality of acknowledgement messages, for example, one for each services identification (SID).

In the following description, for purposes of explanation, numerous examples are set forth in order to provide a thorough understanding of the present invention. It may be evident, however, that the present invention may be practiced in other examples not set forth in the following description. In other instances, structures and devices are shown in block diagram form in order to facilitate describing various aspects of the present invention.

Figure 1:
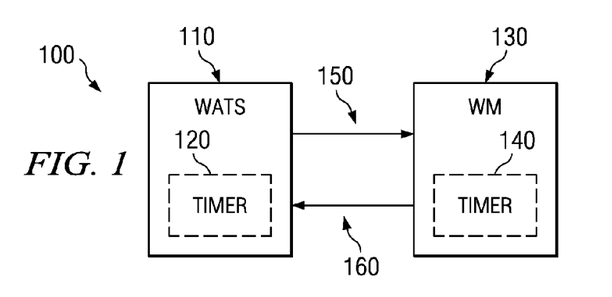
FIG. 1 illustrates a system where a sender and a receiver have timers that can be synchronized in accordance with an aspect of the present invention.

FIG. 1 illustrates a system 100 where a sender 110 (e.g., a WATS or component communicating through the WATS) is communicating with a receiver 130 (e.g., a WM or a component communicating through the WM). While a single sender 110 and a single receiver 130 are illustrated, it is to be appreciated that there can be one or more logical flows between the sender 110 and the receiver 130 as additional communicating components (not illustrated) can transmit through the sender 110 and the receiver 130. Additionally, a sender (e.g., a WATS) can communicate with multiple receivers (e.g., WMS) through a shared upstream channel and each receiver can have multiple SID streams. Furthermore, while the sender 110 is characterized as the sender and the receiver 130 is characterized as the receiver, it is to be appreciated that communications can flow both directions between the sender 110 and the receiver 130.

Both the sender 110 and the receiver 130 have the ability to keep track of time. The sender 110 includes a timer 120 that can keep time in, for example, a thirty two bit global time reference. Similarly, the receiver 130 includes a timer 140 that can also keep time in, for example, a thirty two bit global time reference. There is a physical communication flow between the sender 110 and the receiver 130 that can be viewed logically as a downstream flow 150 (e.g., through WATS to WM) and an upstream flow 160 (e.g., through WM to WATS). As part of the communication flow between the sender 110 and the receiver 130, the timer 120 and the timer 140 can be synchronized.

For example, the sender 110 can establish a base time (e.g., from a satellite signal, from an internal clock) and communicate that base time to the receiver 130. The receiver 130 can then set its timer 140 to that base time. Additionally, and/or alternatively, the sender 110 and the receiver 130 can participate in an initialization process whereby the sender 110 and the receiver 130 individually and/or collectively determine and agree upon a time to set in the timers 120 and 140. Such initialization process can be repeated and/or updated periodically to prevent the timers 120 and 140, which are desirably kept synchronized between the sender 110 and the receiver 130, from losing synchronization. In one example of the present invention, the timer 120 and/or the timer 140 can be adjusted by a ranging offset that is associated with a physical transmission delay, and the round-trip propagation delay between the sender 110 and the receiver 130. Ranging offsets will be discussed further in connection with FIG. 2.

Once the timers 120 and 140 have been synchronized, and/or once the timers 120 and 140 are programmed in a manner that facilitates computing the local time and the remote time (e.g., time at the other end of a communication) a packet can be sent from the sender 110 to the receiver 130. Since the timers 120 and 140 are synchronized, and since the ranging offset has been computed, the sender 110 can store the time $T_{RECEIVE}$ at which it expects the packet to arrive at the receiver 130 or the time it expects an acknowledgement from the receiver 130. It is to be appreciated that the ACK in accordance with one an aspect of the present invention does not occur on a per packet basis, but in a burst mode. For example, after a certain number of packets are transmitted, an ACK or a global ACK frame will be received for the number of transmitted packets. The global ACK frame can include an ACK for a number of packets in addition to a time $T_{ACK}$ at which the ACK is generated in the receiver 130. Upon receiving an ACK that includes an ACK time greater or equal to the time $T_{RECEIVE}$, the sender 110 can determine that the ACK frame should contain an ACK for the packet sent corresponding to the time $T_{RECEIVE}$ and if an ACK is not present for the packet sent corresponding to the time $T_{RECEIVE}$, then the packet was lost.

The receiver 130 can be programmed to periodically transmit an ACK, individually and/or in an ACK frame, to the sender 110. The ACK or ACK frame transmitted from the receiver 130 to the sender 110 contains a data field that stores a value associated with a time $T_{ACK}$ at which the ACK is generated in the receiver 130. Thus, the sender 110 can examine the time value of the $T_{ACK}$ and determine whether the ACK corresponds to the packet(s) sent at time $T_{SEND}$ and expected to be received by the receiver 130 at the time $T_{RECEIVE}$. If the ACK or ACK frame sent at $T_{ACK}$ does not contain an ACK for the packet sent at $T_{RECEIVE}$, then the sender 110 can select between performing actions including but not limited to, retransmitting the packet, abandoning hope of transmitting the packet (e.g., timeout), and requesting that an acknowledgement to the packet be sent or resent. Alternatively, the ranging offset can be employed to compute the time $T_{ACK}$ at the WM when an acknowledgement is being generated.

Since the sender 110 locally records the $T_{RECEIVE}$ and can compare it with an ACK having a time $T_{ACK}$, the sender 110 does not have to maintain a separate timer for each logical flow associated with the physical flow between the sender 110 and the receiver 130, which reduces overhead and complexity at the sender 110. Furthermore, since the time $T_{RECEIVE}$ can be computed (e.g., using the time sent and the ranging offset), a determination of whether a packet has been lost can be made earlier than is possible with a traditional timeout period, providing a more responsive packet control system.

In one example of the present invention, an ACK frame is a MAC layer management frame that carries a number of ACK messages, one per SID. Thus, in the example, for a WM, an ACK frame will include the status of downstream SIDs that are Automatic Request (ARQ) enabled and that were active in a current ACK period. Therefore, by employing a global ACK frame, the number of ACK transmissions are reduced saving bandwidth. A single timestamp can be employed for the entire global ACK frame based on the time that the ACK frame was generated. Additionally, the global ACK frame can be transmitted across one or more messages, so that unused characters in messages can be utilized increasing bandwidth. For example, the global ACK frame can be transmitted across one or more messages in headers of the messages. The global ACK frame can also be transmitted a MAC management message. In one example of the present invention, the global ACK frame includes an ACK sequence number to facilitate detecting missing, lost and/or corrupted ACK frames. When the sender 110 sees that an ACK is missing, the sender 110 can perform actions including, but not limited to, retransmitting a packet for which no ACK was received, requesting an acknowledgement for the packet and/or considering the packet non-transmittable.

Figure 2:
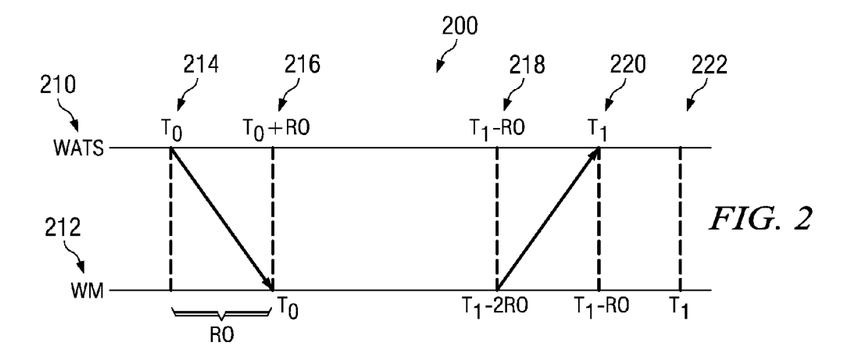
FIG. 2 illustrates timing associated with computing a ranging offset, in accordance with an aspect of the present invention.

It is to be appreciated that in a wireless communication system in which WMs and WATS devices are in a fixed location, a ranging offset (e.g., time of a transmission) between different devices can be determined that is substantially fixed. The ranging offset between devices can be employed to synchronize one or more timers with a WATS device. Turning now to FIG. 2, ranging offsets and time determinations are examined more closely through a timing diagram 200. Two parallel time lines are illustrated in FIG. 2. A time line 210 associated with a WATS displays the time as kept at a WATS. A time line 212 associated with a WM, with which the WATS is communicating, displays the time as kept at a WM.

FIG. 2 illustrates an initial time 214 ($T_0$) time at the WATS. Due to physical transmission delay, a packet transmitted at 214 will arrive at the WM at 216 ($T_0$+RO). The transmission delay can be considered a ranging offset and thus the time at the WATS at 216 can be computed as $T_0$+RO. In one example of the present invention, the timers at the WATS and the WM can be synchronized so that the packet transmitted at 214, which arrives at 216, can appear to have been instantaneously transmitted from the WATS to the WM. For example, the timer at the WM can be adjusted by an amount equal to RO so that at 216, when the packet arrives at the WM, the time at the WM is $T_0$. Thus, if the WATS is locally recording the time $T_{RECEIVE}$ which is approximately equal to the time the packet is arrived to the WM when the timers are synchronized, and thus the WATS need only store one of the two times. Additionally, delays can be computed into the time $T_{RECEIVE}$, such that the time $T_{RECEIVE}$ is approximately equal to the time when the packet is going into the physical media plus the time of the transmission delay from the physical media transmitter circuitry to the air and from the sender to the receiver on the air and the receive delay in the receiver circuitry.

With the WM programmed to periodically transmit ACKs, the WATS can compute if an ACK for the packet sent at $T_{RECEIVE}$ should be received at the WATS when an ACK frame is received with a time $T_{ACK}$ that is greater than or equal to $T_{RECEIVE}$. While the timers were adjusted to make communication from the WATS to the WM appear substantially instantaneous, timing adjustments are required for communications from the WM to the WATS to account for the fact that the WM timer is synchronized with the WATS timer. For example, the time $T_{RECEIVE}$ can be adjusted utilizing the ranging offset or two times the ranging offset, such that a comparison to an the time $T_{ACK}$ can be made.

Consider a transmission from the WM to the WATS that begins at 218 and which will be received at the WATS at 220, which we will define as time $T_1$. As can be seen from the timing diagram 200, the time $T_1$ at the WATS occurs at 220, which is before the time $T_1$ (which occurs at 222) at the WM, due to the timer adjustments. Thus, if the WM desires to have the transmission arrive at time $T_1$ relative to the WATS (e.g., at 220), then the WM will compute the time at which to begin the transmission. Such computation involves determining the WM $T_1$ and calculating twice the ranging offset RO. Thus, for the WM to transmit an ACK that will be received at 220 (WATS $T_1$), the WM will make such transmission at $T_1$−2RO.

Through synchronizing and adjusting the timers at the WATS and the WM, the WATS can transmit packets at a known time and compute when an ACK for those packets should be received. Such pre-computable ACK times mitigates the need for a timeout timer in the WATS.

Figure 3:
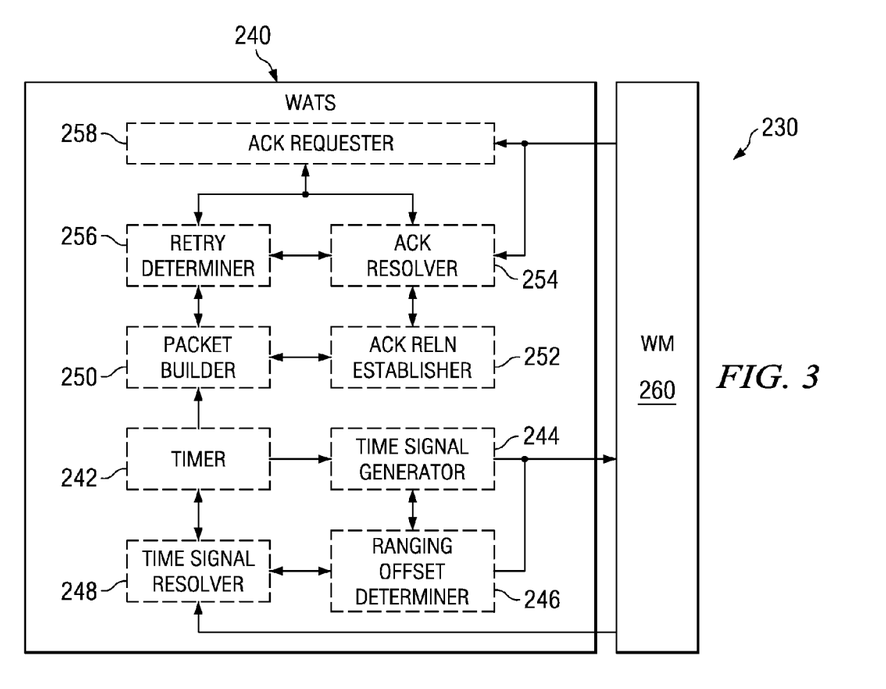
FIG. 3 is a block diagram of a sender configured in accordance with an aspect of the present invention.

FIG. 3 illustrates a system 230 for transmitting packets. The system 230 includes a sender 240 (e.g., a WATS)

comprising a collection of components. The collection of components can be implemented utilizing software and/or hardware. In software, computer executable components can be stored on a computer readable medium, in accordance with an aspect of the present invention. Additionally, the functionality of the collection of components can be combined or partially combined, or portions of functionality provided in separate or combined components. The sender 240 can transmit packets to a receiver 260 (e.g., a WM or downstream SIDs) and receive ACKs back from the receiver 260.

In one example of the present invention, the sender 230 includes a timer 242 that produces a timing reference. The timing reference can be, for example, a 32 bit global timing reference, although it is to be appreciated that other timing references (e.g., 16 bit resolution or less) can be employed in accordance with the present invention. The timer 242 provides the timing reference to a time signal generator 244 that sends the timing reference to an external component (e.g., the receiver 260) during a synchronization or initialization process. The timing reference can, therefore, be employed by the WM to establish and/or maintain synchronization between the timer 242 and a timer (not illustrated) in the receiver 260. The timer 242 can be a software timer or a variety of different hardware timer types.

The sender 240 also includes a ranging offset determiner 246 that computes a delay associated with transmitting between the sender 240 and the external component (e.g., the receiver 260). The ranging offset determiner 246 can employ the time reference produced by the timer 242 and the processing performed by the time signal generator 244 to facilitate computing a ranging offset and thus in establishing and/or maintaining synchronization.

The sender 240 can also include a time signal resolver 248 that can receive timing information and/or packets from an external component to which the timing reference was provided. The received information and/or packet(s) can store an external time reference that facilitates the time signal resolver 248 resolving the actual time at which the packet was sent from the receiver 260 based, at least in part, on the timing reference, the transmission delay, and/or the external component time reference. Thus, the time signal resolver 248 facilitates establishing and/or maintaining synchronization between sender and receiver timers and further facilitates determining whether a transmitted packet should be acknowledged within a pre-determined (e.g., configurable) period of time.

The sender 240 can also include a packet builder 250 that can build and transmit an outgoing packet that will be sent to the receiver 260. Such packets can include, but are not limited to, data packets, control packets, timing packets, management packets and the like. The sender 240 knows the time at which a packet built by the packet builder 250 is transmitted to the receiver 260, and can compute and store locally a time at which the packet is expected to be received by the receiver 260. Typically, this time offset can be established during an initialization period. An acknowledgement relationship establisher 252 can establish a relationship between the time reference stored in the ACK and an expected receive time for the outgoing packet.

The sender 240 can also include an acknowledgement resolver 254 that determines whether an acknowledgement for the outgoing packet has been received corresponding to the expected receive time. In one example of the present invention, the acknowledgement resolver 254 is operably connected to (e.g., is in physical, logical, electrical and/or data contact with) a retry determiner 256 that determines whether an outgoing packet should be retransmitted based, at least in part, on processing performed by the acknowledgement resolver 254. For example, the acknowledgement resolver 254 can determine that an ACK has not been received within a pre-determined, configurable period of time and, thus signal the retry determiner 256 about such omission. The retry determiner 256 can then decide whether to retransmit the packet and/or whether to abandon hope (e.g., timeout) of transmitting the packet.

The retry determiner 256 can keep a pre-determined (e.g., configurable) count of the maximum number of times that it will attempt to transmit a packet. If the packet has been sent that pre-determined number of times, then although the acknowledgement resolver 254 determines that no ACK has been received for the packet, the retry determiner 256 can determine that the sender 240 should move on, and that such packet will not be transmitted yet again. If the packet has not been sent that pre-determined number of times, then the retry determiner 256 can communicate with the packet builder 250 and/or other components to facilitate retransmitting the packet.

In another example of the present invention, the acknowledgement resolver 254 is operably connected to an acknowledgement requester 258 that determines whether an acknowledgement should be requested based, at least in part, on the determination made by the acknowledgement resolver 254. For example, the acknowledgement resolver 254 may determine that no acknowledgement for a packet has been received. But, based, for example, on sequence numbers in an ACK frame, the acknowledgement requester 258 may determine that it is likely that an ACK was sent but not received. Thus, rather than retransmit a packet that may have been received, the sender 240 can, through the acknowledgement requester 258, request an additional ACK frame to be sent. This can save bandwidth, particularly if the packet for which no ACK was received is a large packet and/or one that is difficult to transmit. This can also improve security since the sender 240 can be configured to only retransmit highly secure packets after the acknowledgement resolver 254 determines that no ACK was received even after the acknowledgement requester 258 requested such an ACK.

Figure 4:
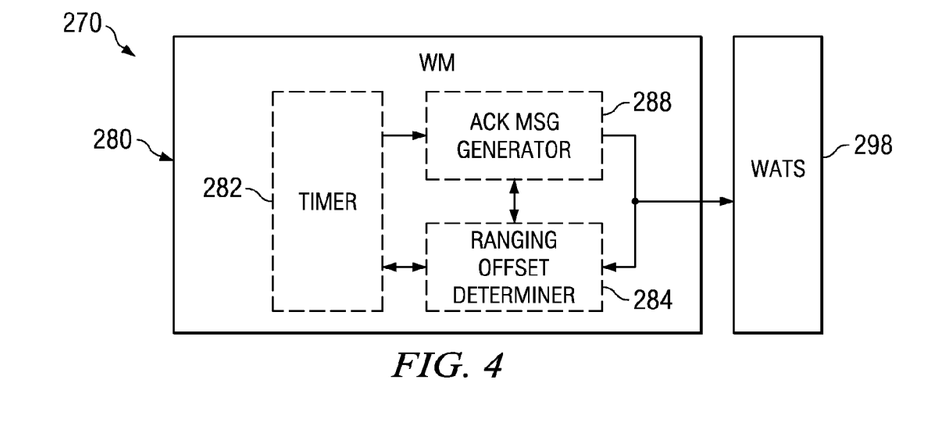
FIG. 4 is a block diagram of a receiver configured in accordance with an aspect of the present invention.

FIG. 4 illustrates a packet receiving system 270 that includes a receiver 280 that can receive packets from a sender 298. The receiver 280 (e.g., a WM or downstream SIDs) can include a timer 282 that can be programmed to store a time received as a timing reference sent from the sender 298 (e.g., a WATS). The timer 282 can also keep time synchronously with a timer associated with the sender. For example, the receiver 280 may receive a global time reference and/or a ranging offset from the sender 298, store such values in memory locations and initialize a timer to compute times based on such stored values. Thus, time synchronization, which facilitates the timestamp based ACK protocol described herein, can be implemented.

The receiver 280 can also include a ranging offset determiner 284 for computing a transmission delay between the system and the time sender. The ranging offset can be employed to facilitate establishing and/or maintaining synchronization between timers. The receiver 280 can also include an acknowledgement message generator 288 that generates an acknowledgement for a packet received from the sender 298. The acknowledgement will include a time value retrieved from the timer, where the time value can be, for example, the time when the acknowledgement was generated. Such a time value can be, for example, the time relative to the receiver 280 and/or the time relative to the sender 298 when the acknowledgement is sent from the receiver 280 to the sender.

It is to be appreciated that the components associated with the receiver 280 can be implemented in software and/or hardware. In software, computer executable components can be stored on a computer readable medium, in accordance with an aspect of the present invention. Additionally, the functionality of the collection of components can be combined or partially combined, or portions of functionality provided in separate or combined components.

Figure 5:
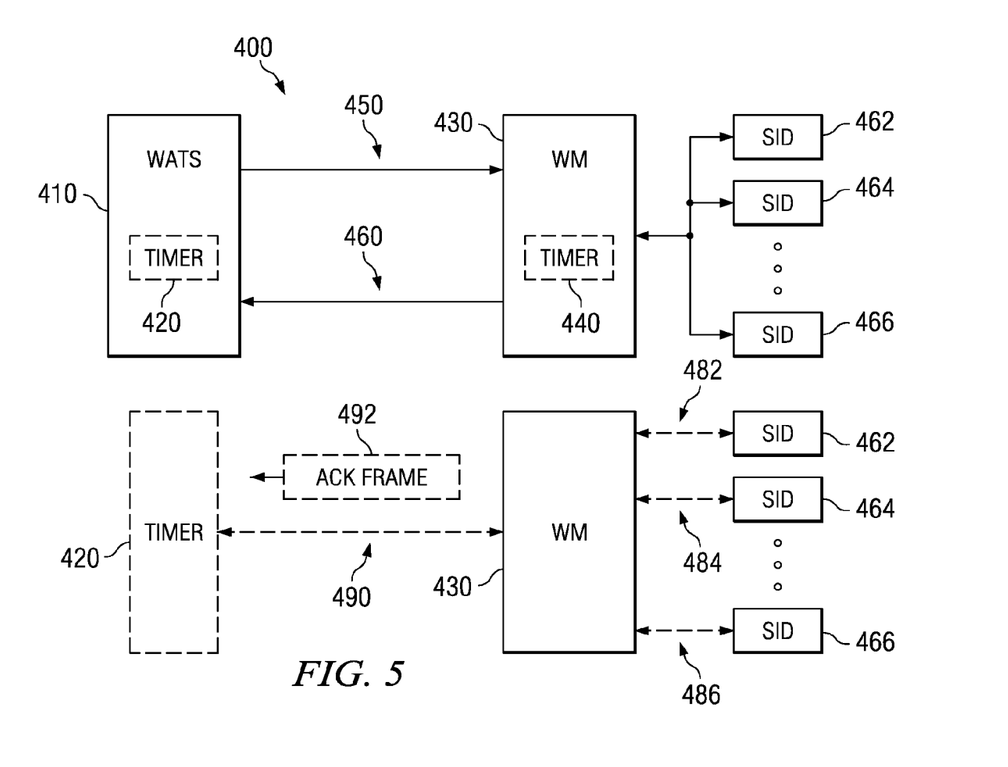
FIG. 5 illustrates logical and physical packet and ACK frame flows in accordance with an aspect of the present invention.

FIG. 5 illustrates physical and logical flows associated with an acknowledgement protocol facilitated by the present invention. The physical flow 400 between a sender (e.g., WATS 410) and a receiver (e.g., WM 430) can be subdivided into a downstream logical flow 450 and an upstream logical flow 460. The sender includes a timer 420 that can be synchronized with a receiver timer 440 using systems and methods described herein.

Components (e.g., SIDs 462, and 464 through 466) can communicate with the sender 410 through the receiver 430. The ACKS from the SIDs can be aggregated into an ACK frame 492 that is transmitted along a logical ACK frame stream 490. Thus, a single timer 420 can be employed in acknowledgement processing. Concerning the ACK frame 492, individual ACKs from the SIDs may be transmitted along individual flows between the SIDS and the receiver 430. For example SID 462 may transmit an ACK along flow 482, while SID 464 transmits an ACK along flow 484. The receiver 430 then aggregates these ACKs into the ACK frame 492, which facilitates mitigating bandwidth waste problems. A single timestamp can be provided in the ACK frame 492. The global ACK frame can be transmitted across one or more messages, so that unused characters in messages can be utilized increasing bandwidth.

In view of the foregoing structural and functional features described above, a methodology in accordance with various aspects of the present invention will be better appreciated with reference to FIGS. 6-11. While, for purposes of simplicity of explanation, the methodologies of FIGS. 6-11 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

Figure 6:
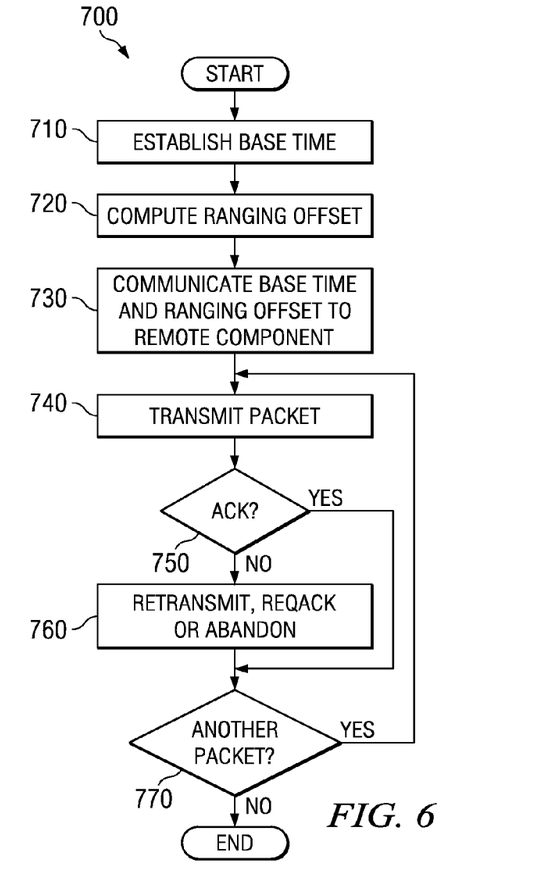
FIG. 6 is a flow chart of a method for controlling packet flow in accordance with an aspect of the present invention.

FIG. 6 illustrates a methodology 700 for controlling packet flow in accordance with an aspect of the invention. At 710, the method 700 includes establishing a base time. For example, a 32 bit global timing reference can be established. Time sources can include, but are not limited to, satellite time signals, internal time signals and ad hoc time signals. At 720, a ranging offset between a sending component and a receiving component is computed. For example, one or more test messages and/or signals and the like can be transmitted through a sender/receiver communication system. The transit time can be employed to determine the ranging offset.

At 730, a sending component can communicate the base time and/or the ranging offset to a receiving component. Alternatively and/or additionally, a receiving component could communicate the base time and/or ranging offset to a sending component and/or the sending component and the receiving component could collaboratively determine the base time and ranging offset. After 730, whichever base time and ranging offset determination and/or communication method is performed, the sender and the receiver will have information sufficient to synchronize timers local to the sender and receiver.

At 740, the sender transmits a packet to the receiving component. The sender can utilized the base time to determine the time at which the packet was sent and thus can compute the time at which the sender expects the packet to be received by the receiver (e.g., utilizing the ranging offset). Thus, at 750, a determination is made concerning whether an acknowledgement to the packet transmitted at 740 has been received within a pre-determined period of time. If the determination at 750 is YES, then processing proceeds to 770. But if the determination at 750 is NO, then at 760, the sender can select between actions including, but not limited to, retransmitting the packet transmitted at 740, requesting an acknowledgement for the packet transmitted at 740 and abandoning further attempts to transmit the packet.

Thus, at 760, the method 700 can selectively retransmit the packet based, at least in part, on whether an acknowledgement to the packet was received. Similarly, at 760, the method 700 can selectively request an acknowledgement to the packet transmitted at 740 based, at least in part, on the determination of whether an acknowledgement to the packet was received. At 770, a determination is made whether there is another packet to transmit. If the determination at 770 is YES, then processing returns to 740, otherwise processing can conclude.

Figure 7:
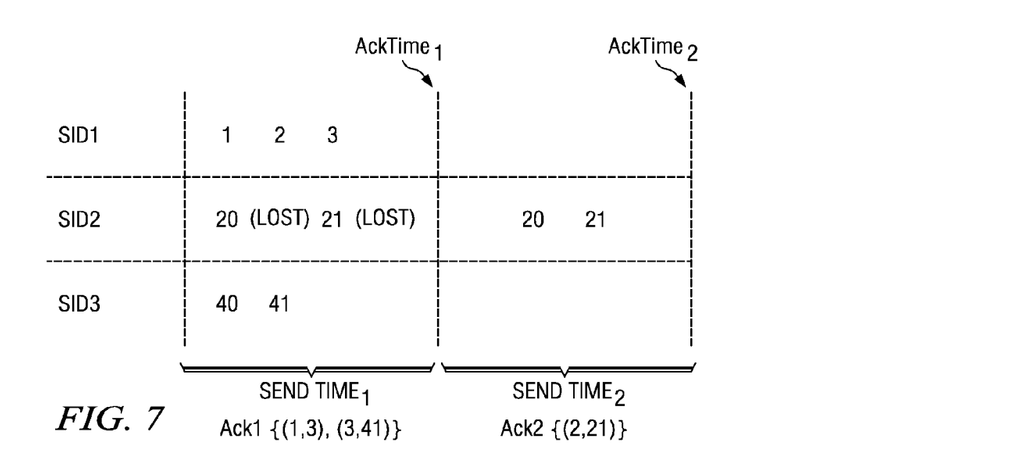
FIG. 7 is a timing diagram that illustrates a sample packet flow in accordance with an aspect of the present invention.

FIG. 7 illustrates a sample packet flow diagram associated with an acknowledgement protocol facilitated by the present invention. Three SIDs, packets communicated to the SIDs and aggregated acknowledgements returned from a receiver that aggregates ACKs from the SIDs are illustrated. Thus, during SEND TIME$_1$, three packets (e.g., packet 1, 2, 3) are sent to SID1 and received by SID1. Also during SEND TIME$_1$, two packets (e.g., packet 20, 21) are sent to SID2, but these two packets are lost. Also during SEND TIME$_1$, two packets (e.g., packet 40, 41) are sent to SID3 and these two packets are received.

Thus, at AckTime$_1$, an aggregated acknowledgement ACK1 is transmitted from the ACK aggregator to the sender. ACK1 indicates that the last packet received correctly for SID1 was packet 3, thus the sender knows that all packets sent to SID1 were correctly received. ACK1 also indicates that the last packet received correctly for SID3 was packet 41, thus the sender knows that all packets sent to SID3 were correctly received. However, ACK1 does not contain information about SID2. But the sender knows that packets 20 and 21 were sent to SID2. Thus, based on the information received in ACK1, the sender can retransmit, during SEND TIME$_2$, the packets 20 and 21. ACK2, sent at AckTime$_2$ indicates that these packets were received.

The synchronization of timers between a sender and receiver and the storing of a timestamp in aggregated acknowledgements from the receiver to the sender facilitate shortening a timeout period so that the sender can determine, at AckTime1, whether retransmission is required, thus time savings is facilitated.

Figure 8:
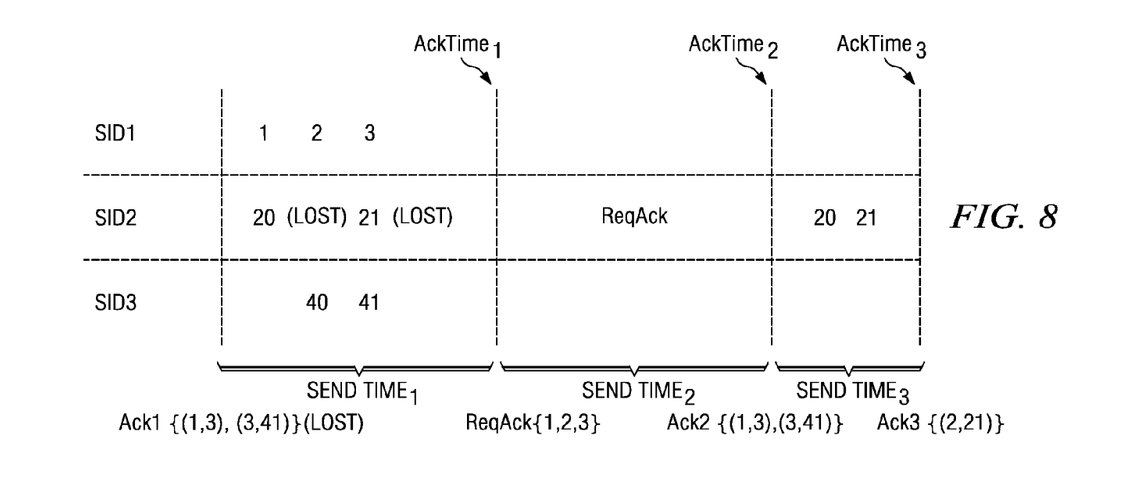
FIG. 8 is a timing diagram that illustrates a sample packet flow in accordance with an aspect of the present invention.

FIG. 8 illustrates a sample packet flow diagram associated with an acknowledgement protocol facilitated by the present invention. Three SIDs, packets communicated to the SIDs, an acknowledgement request and aggregated acknowledgements returned from a receiver that aggregates ACKs from the SIDs are illustrated. Thus, during SEND TIME$_1$, three packets (e.g., packet 1, 2, 3) are sent to SID1 and these three packets are received by SID1. Also during SEND TIME$_1$, two packets (e.g., packet 20, 21) are sent to SID2 and are lost. Also during SEND TIME$_1$, two packets (e.g., packet 40, 41) are sent to SID3 and these two packets are received. Thus, at AckTime$_1$, an aggregated acknowledgement ACK1 is transmitted from the ACK aggregator to the sender. Assume that this ACK1 is lost. ACK1 indicated that the last packet received correctly for SID1 was packet 3, thus the sender should know that all packets sent to SID1 were correctly received. But the aggregated ACK was lost, and thus the sender does not gain the knowledge. ACK1 also indicated that the last packet received correctly for SID3 was packet 41. The sender was expecting, at AckTime$_1$ an acknowledgement. Since no acknowledgement was sent, and since, for example, several packets would have to be retransmitted, the sender determines during SENDTIME$_2$ not to automatically retransmit, but rather to request an acknowledgement.

In response to the ReqAck transmitted during SEND-TIME$_2$, the receiver transmits ACK2. Thus, at AckTime$_2$, an aggregated acknowledgement ACK2 is transmitted from the ACK aggregator to the sender. ACK2 indicates that the last packet received correctly for SID1 was packet 3, thus the sender knows that all packets sent to SID1 were correctly received. ACK2 also indicates that the last packet received correctly for SID3 was packet 41, thus the sender knows that all packets sent to SID3 were correctly received. However, ACK2 does not contain information about SID2. But the sender knows that packets 20 and 21 were sent to SID2. Thus, based on the information received in ACK2, the sender can retransmit, during SEND TIME$_3$, the packets 20 and 21. ACK3, sent at AckTime$_3$ indicates that these packets were received.

Figure 9:
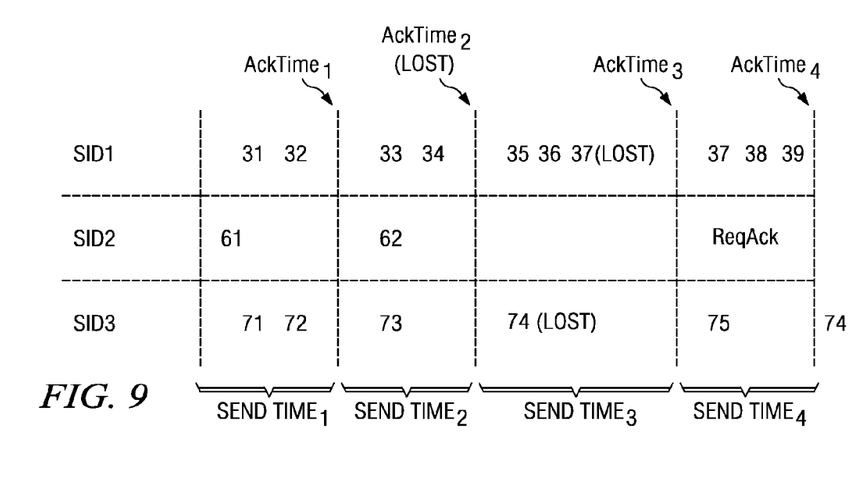
FIG. 9 is a timing diagram that illustrates a sample packet flow in accordance with an aspect of the present invention.

FIG. 9 illustrates a sample packet flow diagram associated with an acknowledgement protocol facilitated by the present invention. Three SIDs, SID1, SID2, and SID3 are sent packets. During SENDTIME$_1$, SID1 is sent packets 31 and 32 and these packets are received correctly. Also during SENDTIME$_1$, SID2 is sent packet 61 and this packet is received correctly. Also during SENDTIME$_1$, SID3 is sent packets 71 and 72 and these packets are received correctly. Thus, at AckTime$_1$, an aggregated ACK1 is transmitted from the aggregating ACK receiver to the sender. ACK1 could be described, for example, as ACK1 {(1,32), (2,61), (3,72)} which indicates that SID1 received up to packet 32 correctly, SID2 received up to packet 61 correctly and SID3 received up to packet 72 correctly. Thus, all packets transmitted during SENDTIME$_1$ were received correctly and acknowledged.

During SENDTIME$_2$, SID1 is sent packets 33 and 34 and these packets are received correctly. Also during SEND-TIME$_2$, SID2 is sent packet 62 and this packet is received correctly. Also during SENDTIME$_2$, SID3 is sent packet 73 and this packet is received correctly. Thus, at AckTime$_2$, an aggregated ACK2 is transmitted from the aggregating ACK receiver to the sender. ACK2 could be described, for example, as ACK2 {(1,34), (2,62), (3,73)} which indicates that SID1 received up to packet 34 correctly, SID2 received up to packet 62 correctly and SID3 received up to packet 73 correctly. IN the present example, ACK2 is lost. Thus, the sender, which was expecting at AckTime$_2$ an acknowledgement for the packets transmitted during SENDTIME$_2$ can take actions including, but not limited to, retransmitting the packets, requesting an acknowledgement, or just waiting a little longer for the ACK. In the illustrated example, the sender determines to wait until a later AckTime before requesting an acknowledgement and/or retransmitting the packets.

Thus, during SENDTIME$_3$, SID1 is sent packets 35, 36 and 37 from which 35 and 36 are received correctly and 37 is lost. Also during SENDTIME$_3$, SID2 is not sent any more packets. Also during SENDTIME$_3$, SID3 is sent packet 74 and this packet is lost. Thus, at AckTime$_3$, an aggregated ACK3 is transmitted from the aggregating ACK receiver to the sender. ACK3 could be described, for example, as ACK3 {(1,36)} which indicates that SID1 received up to packet 36 correctly, from which it can be assumed that packets 33 and 34 were also received correctly. A sequence number associated with ACK3 could inform the sender that ACK2 was in fact lost. Furthermore, other information can be extracted from ACK3. For example, there was no ACK for SID2 or SID3, thus the sender knows that information concerning SID2 and SID3 is not up to date. The information for SID2 is now two send times old, and thus during SENDTIME4, the sender can send a ReqAck for SID2, while retransmitting a lost packet 37 for SID1 and transmitting new packets for SID1 and SID3 as illustrated.

In response to the ReqAck for SID2 and the new packets transmitted to SID1 and SID3, at time AckTime$_4$, the aggregating ACK receiver can transmit an ACK4 {(1,39), (2,62), (3,73)}. Based on the information in ACK4, the sender can update its information and now knows that SID1 has received up to packet 39 correctly, the SID2 has received up to packet 62 and that SID3 lost packet 74.

The three sample packet and ACK flows illustrated in FIGS. 7, 8 and 9 are merely illustrative and it is to be appreciated that the present invention can interact with and/or generate other packet and ACK flows.

Figure 10:
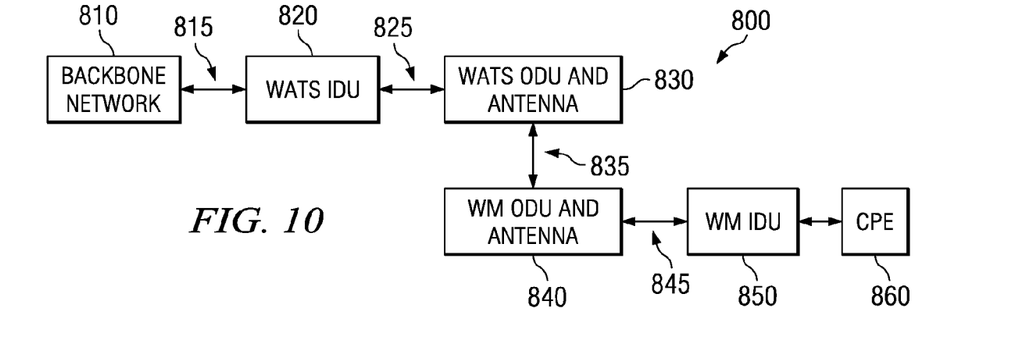
FIG. 10 is a block diagram of an environment in which the present invention may be employed.

FIG. 10 illustrates an environment 800 in which the present invention can be employed. The environment 800 includes a backbone network 810 (e.g., Internet, intranet) from which packets can be generated that are intended to be communicated to one or more customer premises equipments (CPE) 860. The backbone network 810 interacts with a WATS indoor unit (IDU) 820 via a WATS interface 815. The WATS IDU 820 in turn interacts with a WATS outdoor unit (ODU) and/or antenna 830 via a WATS IDU/ODU interface 825. Signals are transmitted in and over the air signal 835 from the WATS ODU 830 and are received by a WM ODU and/or antenna 840. The WM ODU and/or antenna 840 then interacts with a WM IDU 850 via a WM/IDU interface 845. The WM IDU 850 then interacts with one or more CPEs 860 delivering the packets that were generated at the backbone network 810, for example. While data flow from the backbone network 810 to the CPEs 860 is illustrated in FIG. 10, it is to be appreciated that packets, ACKs and other messages and/or signals can flow from the CPEs 860 to the backbone network 810.

Figure 11:
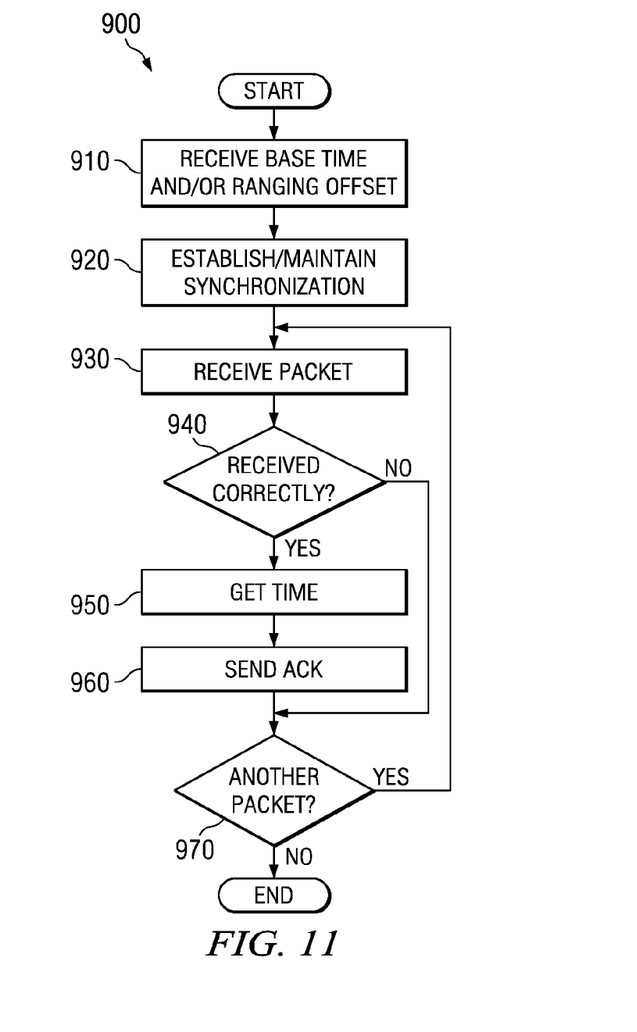
FIG. 11 is a flow chart of a method for controlling packet flow in accordance with an aspect of the present invention.

FIG. 11 illustrates a methodology 900 for controlling packet flow in accordance with an aspect of the present invention. At 910, a base time and/or a ranging offset are received from a sending component (e.g., a WATS). Thus, a timer associated with a receiver on which the method 900 can be implemented can be synchronized based on such received base time and/or ranging offset. Therefore, at 920, synchronization can be established and/or maintained. It is to be appreciated that the maintenance begun at 920 can be carried out concurrently with subsequent blocks in method 900.

At 930, a packet is received from a sending component. Such packet can be, for example, a data packet, a control frame, a message, a signal and the like. At 940, a determination is made concerning whether the packet was received correctly. For example, a block check character or cyclical redundancy check character may be examined to determine packet correctness. If the determination at 940 is NO, then an acknowledgement will not be sent for the packet and processing will proceed to 970. If, however, the packet was received correctly, then at 950, the receiving component on which the method 900 is implemented can retrieve a time at 950 and build an acknowledgement to the packet received at 930 that will include a time reference. The acknowledgement can be a global acknowledgement, such that one time reference is provided for a plurality of packets and a number of ACKs corresponding to the plurality of packets. Such a time reference can be employed by the receiver of the ACK in determining whether an ACK for a message has been timely received. At 960, the ACK and the time reference from 950 is transmitted and processing continues to 970. At 970, a determination is made concerning whether the method wants to receive another packet. If so, processing returns to 930, otherwise processing concludes. It is to be appreciated that the packet receive blocks can run in parallel with the ACK frame generation and transmit blocks.

In another example of the present invention, the method 900 can include receiving a request for an acknowledgement to a packet sent by the sending component. Based on the request for acknowledgement, and determined by whether the receiver correctly received the packet, the method 900 can selectively send an acknowledgement of the packet to the sending component, where the acknowledgement carries a data field storing the receiver time when the acknowledgement was sent.

Figure 12:
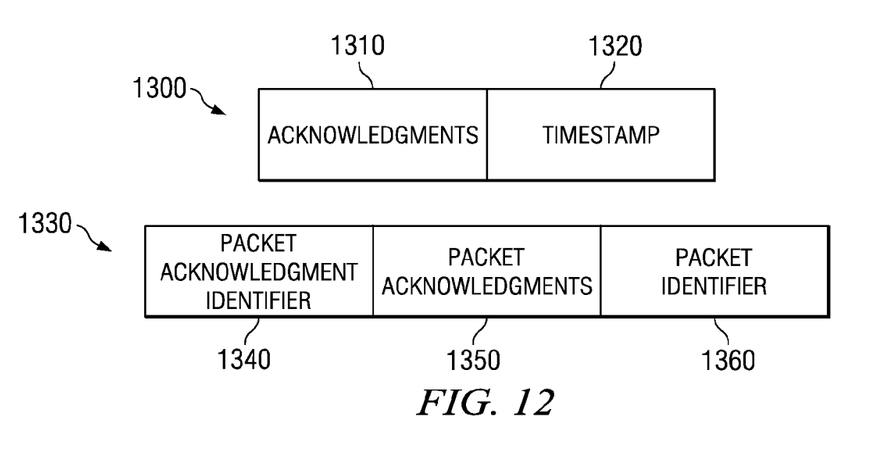
FIG. 12 illustrates a packet and an acknowledgement frame that can be employed for packet flow control in accordance with an aspect of the present invention.

Turning now to FIG. 12, a global acknowledgement frame 1300 is illustrated for transmitting a plurality of acknowledgements between a WATS and a WM. The global acknowledgement frame includes a first portion 1310 that holds a plurality of acknowledgements to a plurality of packets received at the WM from the WATS and a second portion 1320 that holds a WM local time when the global acknowledgement frame was generated by the WM, where the local time is related to a base time established in the WATS. The plurality of packet acknowledgements can also include identifiers that identify the packet in which the acknowledgement corresponds in addition to SIDs. Thus, the global acknowledgement frame 1300 can be employed to facilitate the acknowledgement protocol described herein. While the global acknowledgement frame 1300 is illustrated with two portions, it is to be appreciated that an acknowledgement frame employed in accordance with the present invention can have a greater and/or lesser number of portions.

FIG. 12 also illustrates a global acknowledgement frame 1330 for transmitting between a WATS and a WM that can be employed to aggregate acknowledgements. The acknowledgement frame 1330 includes a first portion or field 1340 that holds a packet acknowledger identifier that can be employed to identify from which receiving component (e.g., WM) the frame 1330 is being transmitted. The frame 1330 also has a second portion or field 1350 that holds a plurality of packet acknowledgements. The plurality of packet acknowledgements can also include identifiers that identify the packet in which the acknowledgement corresponds. The frame 1330 also has a third portion or field 1360 that holds a packet identifier that identifies a packet as an acknowledgement frame. While the acknowledgement frame 1330 is illustrated with three portions, it is to be appreciated that an acknowledgement frame employed in accordance with the present invention can have a greater and/or lesser number of portions. A single timestamp per acknowledgement frame can be provided in any of the illustrated three portions.

In one example of the present invention, an ACK message may include a SID field, a type field, a length field, a sequence number field, a reserved field and an information map field. The SID field can store the service identifier of the data flow on which an acknowledgement is generated. The type field may be a bitfield, for example, that stores the type of ACK message. The length field can store the length of the ACK message by, for example, storing the total number of bytes in the ACK message after the length field. The sequence number field can store the sequence number of the first expected frame and can also be a starting sequence number for a receive window, for example. The information map field can store a map of a receiver window showing frames that are lost and received, for example. Depending on the message type, (as recorded in the type field), the information map can be, for example, a complete bitmap, a simplified bitmap or a series of ranges. In one example of the present invention, if all packets have been correctly received in sequence, the field will be empty.

Figure 13:
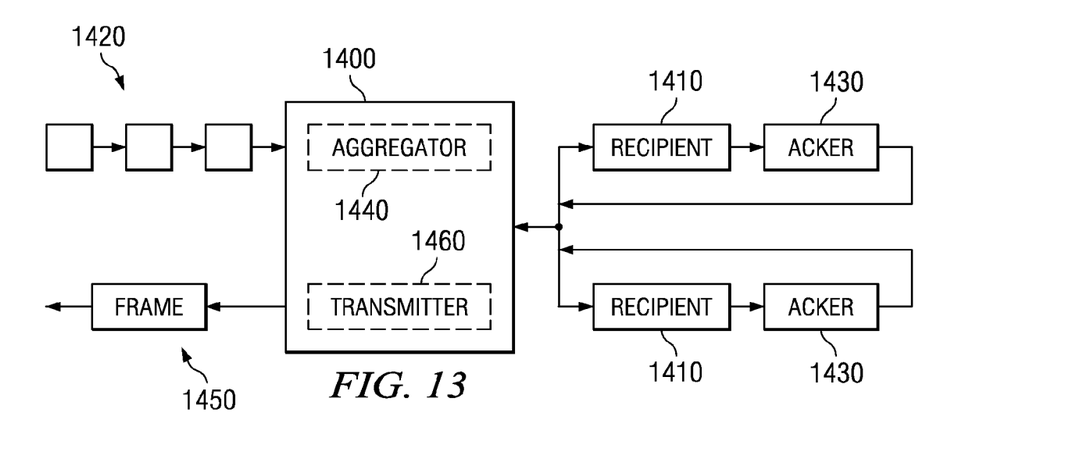
FIG. 13 is a block diagram that illustrates a system for controlling packet flow in accordance with an aspect of the present invention.

FIG. 13 illustrates a system 1400 for controlling packet flow. The system 1400 interacts with one or more packet recipients 1410 for which packets 1420 from a sending component are intended. The system 1400 also interacts with one or more packet acknowledgers 1430 that generate acknowledgements to the received packets. The system 1400 includes an acknowledgement aggregator 1440 that packages the one or more acknowledgements into an acknowledgement frame 1450 in addition to a single timestamp for transmission back to the sending component. Thus, the system 1400 also includes an acknowledgement frame transmitter 1460 that sends the acknowledgement frame 1450 to the sending component.

The system 1400 can be employed in a method for controlling packet flow. The method interacts with components that receive packets from a sending component. Such components produce acknowledgements to the received packets and aggregate the acknowledgements into an acknowledgement frame. The method then transmits the acknowledgement frame back to the sending component. Thus, more efficient acknowledgement transmittal can be achieved than is possible with conventional, non-aggregating methods.

What has been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A wireless communication system, comprising:
a sender having a timer that produces a timing reference;
a time signal generator that sends the timing reference to a receiver;
a ranging offset determiner that computes a delay associated with transmitting between the sender and the receiver, the receiver having a timer that is synchronized to the timer of the sender based, at least in part, on at least one of, the timing reference, the delay, and the timer of the receiver;
the sender further comprising a store for storing an expected receive time which based on the delay;

an acknowledgement relationship establisher that establishes a relationship between the time reference and the expected receive time for an outgoing packet;

an acknowledgement resolver that determines whether an acknowledgement received corresponds to the outgoing packet utilizing the expected receive time; and a retry determiner that determines whether the outgoing packet should be retransmitted based, at least in part, on the determination made by the acknowledgement resolver.

2. The system of claim 1, where the timing reference is a 32 bit global timing reference.

3. The system of claim 1, comprising:

an acknowledgement requester that determines whether an acknowledgement should be requested based, at least in part, on the determination made by the acknowledgement resolver.

4. The system of claim 1, the sender being a wireless access termination modem system and the receiver being a wireless modem.

5. The system of claim 1, the sender being a wireless modem and the receiver being a wireless access termination modem system.

6. A packet receiving system, comprising:

a timer operable to be set to a time related to a timing reference received from a time sender, the timer further operable to keep time synchronously with a timer associated with the time sender;

an acknowledgement generator that generates an acknowledgement for a packet received from the time sender, where the acknowledgement includes a time value retrieved from the timer, where the time value is the time when the acknowledgement was generated;

a ranging offset determiner that computes a transmission delay between the sender and the system, the system utilizing the computed transmission delay to establish time synchronization between the timer and a timer at the sender; and a memory location for storing an expectation time value representing the time an acknowledgement is expected to be received by the time sender based on the delay.

7. A method for controlling packet flow comprising:

establishing a base time;

computing a ranging offset between a sender and a receiver;

communicating at least one of the base time and the ranging offset to the receiver; and synchronizing timers of at least one of the sender and the receiver based on the at least one of the base time and the ranging offset;

transmitting a packet to the receiver;

storing a time that the packet is expected to be received at the receiver;

determining whether an acknowledgement contains a time value corresponding to the expected receive time, such that the acknowledgement corresponds to the packet; and selectively retransmitting the packet based, at least in part, on the determination of whether an acknowledgement to the packet is received.

8. The method of claim 4, comprising selectively requesting an acknowledgement to the packet based, at least in part, on the determination of whether an acknowledgement to the packet is received.

9. A method for controlling packet flow, comprising:

transmitting a packet from a sender to a receiver;

storing a time value indicative of an expected time that the packet is to be received by the receiver;

extracting an acknowledgement time from an acknowledgement from the receiver;

determining if the acknowledgement received corresponds to the packet utilizing the expected time and the acknowledgement time;

establishing synchronization between a time of the sender and a timer of the receiver prior to transmitting the packet;

sending a packet to the sender from the receiver;

storing a time value indicative of an expected time that the packet is to be received by the sender by compensating for a ranging offset associated with a transmission delay between the receiver and sender;

extracting an acknowledgement time from an acknowlededciement from the sender; and determining if an acknowledgement received from the sender corresponds to the packet sent by the receiver utilizing the expected time that the packet is to be received by the sender and the acknowledgement time extracted from an acknowledgement from the sender.

10. The method of claim 9, the establishing synchronization comprising transmitting a base time and a ranging offset to the receiver and adjusting the timer of the receiver to the time of the sender by utilizing the base time and the ranging offset.

11. The method of claim 9, the acknowledgement time being the time when the receiver generates the acknowledgment.

* * * * *